July 16, 1957
M. A. HARB
2,799,243
CEMENT SPRAYING MACHINE FOR TIRES
Filed Nov. 17, 1955
2 Sheets-Sheet 1
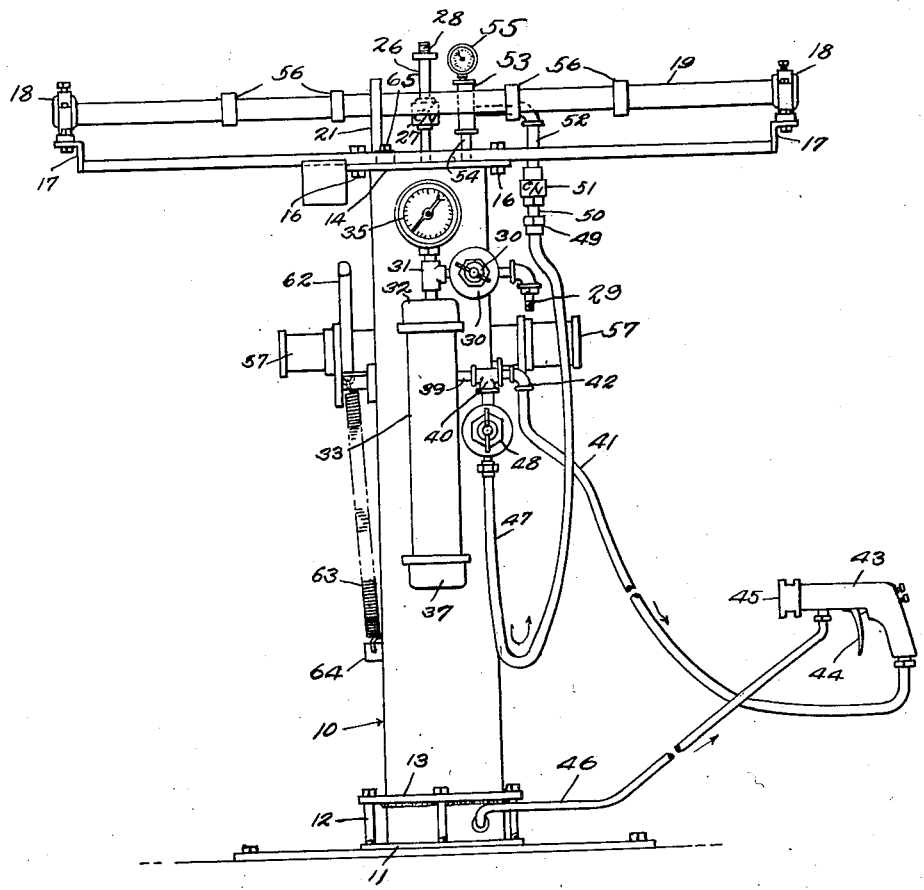
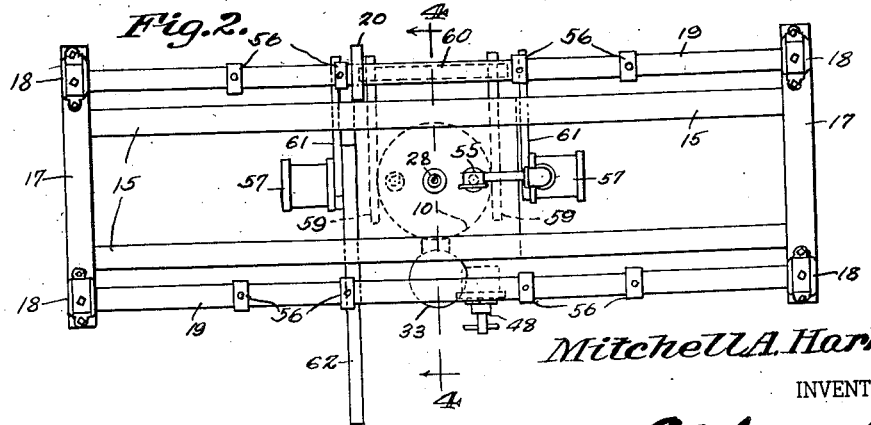
Mitchell A. Harb
INVENTOR
BY C. A. Snow & Co.
ATTORNEYS July 16, 1957  M. A. HARB  2,799,243
CEMENT SPRAYING MACHINE FOR TIRES
Filed Nov. 17, 1955  2 Sheets-Sheet 2

Mitchell A. Harb
INVENTOR

BY C. A. Snow & Co.
ATTORNEYS.

United States Patent Office 2,799,243
Patented July 16, 1957

2,799,243

CEMENT SPRAYING MACHINE FOR TIRES

Mitchell A. Harb, Lexington, N. C.

Application November 17, 1955, Serial No. 547,523

1 Claim. (Cl. 118—320)

This invention relates to a machine for spraying cement or adhesive onto a tire casing.

In the treatment of tires during a recapping operation the outer surface of the tire is cleaned and trimmed and then the surface coated with cement and the cap or camel back is mounted about the casing and the assembly is then vulcanized together.

An object of this invention is to provide an improved means whereby the liquid cement which is applied to the exterior of the tire casing, can be cleanly and smoothly applied.

Another object of this invention is to provide a machine of this kind which will keep the cement in a mixed condition and will also filter the air discharged into a reservoir or main tank.

A further object of this invention is to provide a machine of this kind which includes means for rotating a pair of tires so that the moving tires will be sprayed evenly about the exterior surface thereof.

With the foregoing and other objects in view which will appear as the description proceeds, the invention consists of certain novel details of construction and combination of parts, hereinafter more fully described and pointed out in the claim, it being understood that changes may be made in the construction and arrangement of parts without departing from the spirit of the invention as claimed.

Referring to the drawings:

Figure 1 is a detail front elevation of a cement spraying and mixing machine constructed according to an embodiment of this invention.

Fig. 2 is a plan view of the machine.

Figure 3:
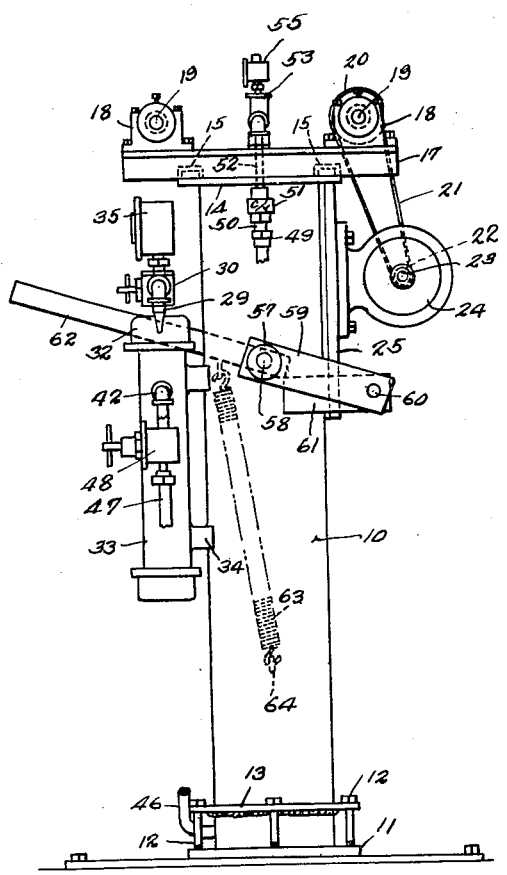
Fig. 3 is a detail end elevation of the machine.
Figure 4:
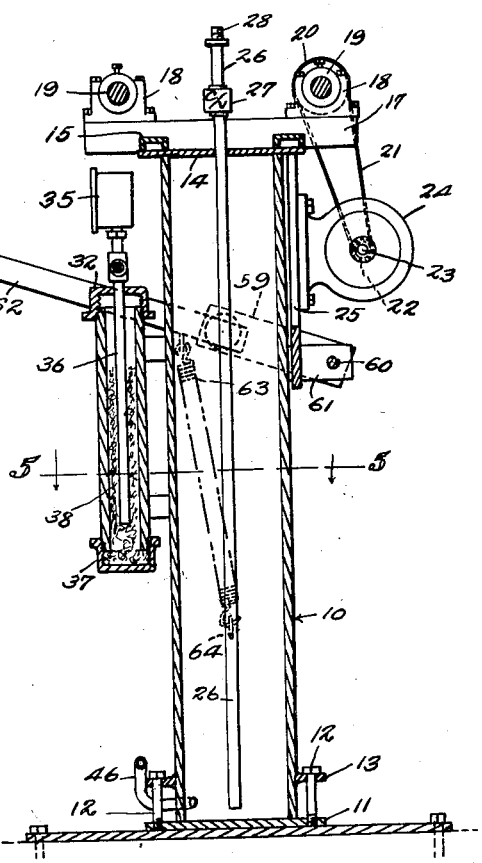
Fig. 4 is a sectional view taken on line 4—4 of Fig. 2.
Figure 5:
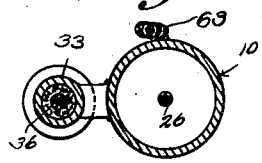
Fig. 5 is a horizontal section taken on line 5—5 of Fig. 4.

Referring to the drawings, the numeral 10 designates generally an upright tank or supply reservoir which is provided with a bottom head 11 secured to the lower end of the tank 10 by means of bolts 12 which are extended through a ring 13. The ring 13 is welded or otherwise fixed to the lower portion of tank 10 above the bottom end so that the bottom head 11 can be readily removed for cleaning of the tank 10. The tank 10 is also formed at its upper end with an upper head 14 which may be welded or otherwise fixed to the upper end of tank 10. A pair of elongated parallel bars 15 which are channel-shape in transverse section are secured by a fastening means 16 to the upper head 14 and project laterally from each side of the tank 10. The outer ends of the channel bars 15 are connected together by means of end angle bars 17 and each bar 17 has secured to the upper side thereof, a pair of hubs or pillow blocks 18. A pair of tire supporting shafts 19 are journaled at the opposite ends thereof in the bearings 18 and one shaft 19 has fixed thereto a curved pulley 20 about which a belt 21 engages. The belt 21 also engages about a driving pulley 22 secured to a motor shaft 23. The shaft 23 is rotated by means of a motor 24. The motor 24 is secured to a pair of depending supporting bars 25 which extend downwardly from the upper head 14. The tank 10 is adapted to have a liquid cement disposed therein and the cement is placed under air pressure. The air pressure may be initially discharged into the tank 10 through an air intake pipe 26 which extends centrally and downwardly through the head 14. A downwardly opening check valve 27 is interposed in the pipe 26 above the head 14. The pipe 26 at its lower end terminates closely adjacent but spaced from the bottom head 11 so that when air is discharged into the tank 10 this air will agitate the cement and other ingredients in the tank 10. The upper end of the pipe 26 is threaded or otherwise formed as indicated at 28 so that the end of an air pressure hose may be quickly connected therewith.

The material in the tank 10 is maintained under a predetermined air pressure from an air supply connection 29. This connection 29 may be connected to an air pump or other source of air pressure and the air in connection 29 is discharged into a valve 30 which is connected to a T-coupling 31. The coupling 31 is connected to the upper cap 32 of a cylindrical filter 33 which is fixed to outstanding supporting lugs 34 carried by the tank 10.

An air pressure gauge 35 extends upwardly from the T-connection 31 so that the air pressure entering the filter 33 can be visually determined. The filter 33 includes a pipe 36 extending downwardly from cap 32 and terminating adjacent the lower cap 37. A filtering medium 38 which may be of fibrous material is disposed in the filter member 33. An outlet pipe 39 is connected to the filter member 33 above the lower end thereof and a T-connection 40 is connected at one side thereof to the outlet pipe 39. A flexible air line 41 is connected at one end of an L 42 which is connected with the T 40 and the opposite end of the flexible line 41 is connected to a spray gun 43. The spray gun 43 is of conventional construction and includes a trigger 44 with a spray nozzle 45. The liquid cement in tank 10 is taken off from the lower portion of the tank through a flexible connection 46 which is connected with the spray gun 43.

The tank 10 is kept under constant air pressure by means of a flexible air line 47 which is connected at one end to a valve 48, and valve 48 is connected with the T 40. The line 47 has a quick-detachable connector 49 on its upper end which is engageable with a pipe connection 50. The pipe connection 50 is connected with an upwardly opening check valve 51 and check valve 51 is connected by means of an L-pipe 52 to a T-connection 53. The T-connection 53 is connected by means of a pipe 54 to the upper head 14 and a pressure gauge 55 is connected with the T-connection 53.

When the valve 48 is open air under pressure is discharged into the tank 10 above the liquid so that the liquid will readily be forced out of the bottom of the tank through the line 46. The tire is adapted to engage over the two shafts 19 and be disposed between a pair of collars 56 which are adjustably secured to shaft 19. Each shaft 19 has two pairs of collars 56 mounted thereon for supporting a pair of tires, one on each side of the tank 10. The tires are adapted to extend downwardly and a lower pair of rollers 57 are rotatably carried by shank pins 58 extending outwardly from a pair of crank arms 59. The crank arms 59 are secured to a horizontal shaft 60 which is rockable by a pair of rearwardly projecting supporting bars 61 fixed to tank 10. An elongated lever or handle 62 is fixed to shaft 60 and is constantly urged downwardly by means of an elongated spring 63 which is secured as at 64 to the lower portion of tank 10. The wheels or rollers 57 are disposed in a plane midway between the two shafts 19 and are adapted, when disposed in the inner circle of each tire, to snugly hold the tire in order that the tire may be rotated with rotation of the driving shaft 19.

In the use and operation of this machine a liquid cement is discharged into the tank 10 through a filler plug 65 which is threaded into the upper head 14. The air intake connection 29 is connected to the source of air pressure and when valve 30 is open air under pressure is discharged into filter member 33, and from filter member 33, air under pressure is discharged through line 47 into the top of tank 10 when valve 48 is open. At the same time air under pressure passes through flexible line 41 to gun 43. The liquid under pressure in tank 10 is forced from the bottom thereof through line 46 into gun 43 and the liquid under pressure in line 46 is formed into a spray by means of the air passing through line 41 and through nozzle 45. When the machine is initially operated such as in the morning after having been left over night, the cement in tank 10 is agitated by uncoupling line 47 with the coupling 49 and connecting coupling 49 to the connection 28 at the top of pipe 26. At this time air under pressure will be discharged through the bottom of pipe 26 into tank 10 and the liquid cement will thereby be agitated or mixed in a thorough manner. While the cement is being sprayed from gun 43 each tire is rotated by the motor 24 so that the cement will be sprayed evenly and quickly about the entire surface of the tire.

What is claimed is:

In a device of the character described for coating tires in combination, a support comprising a vertical cylindrical supply tank, a bottom head for said tank, a ring secured to said tank adjacent to but spaced from said bottom head, bolts connecting said ring and said bottom head for removably securing said bottom head to said tank, an upper head secured to said tank, a pair of elongated channel shaped parallel bars secured to and projecting laterally from each side of said upper head, angle bars connecting the outer ends of said channel shaped bars, a pair of journals carried by each angle bar, rotatable tire supporting shafts mounted in said journals extending parallel to said channel bars, power means including a motor supported by said upper head for rotating one of said shafts, air supply means for supplying air under pressure to said tank, a cylindrical filter tank in said air supply means and secured to said supply tank, a T connection including one leg connected to the outlet of said filter tank, a second leg connected to said supply tank, a spray gun, a flexible line connecting the third leg of said T connection to said spray gun, an air control valve in the connection between said second leg and said supply tank, a check valve in said last mentioned connection; supporting bars carried by said tank, a shaft rockably carried by said supporting bars, crank arm secured on said last mentioned shaft, rollers carried by said crank arms for engaging a tire positioned upon said tire supporting shafts, a handle movable to rock said shaft, and a cement line extending from the bottom of said supply tank to said spray gun.

References Cited in the file of this patent
UNITED STATES PATENTS

| | | |
|---|---|---|
| Re. 14,765 | Urbach | Dec. 2, 1919 |
| 1,466,456 | Nordell | Aug. 28, 1923 |
| 1,471,787 | Gammeter | Oct. 23, 1923 |
| 1,850,238 | Maynard | Mar. 22, 1932 |
| 1,876,967 | Frause et al. | Sept. 13, 1932 |
| 1,983,684 | Strong | Dec. 11, 1934 |
| 2,355,382 | Leguillon | Aug. 8, 1944 |
| 2,498,953 | Glynn | Feb. 28, 1950 |
| 2,721,148 | Reading | Oct. 18, 1955 |